United States Patent
Jeong

(10) Patent No.: US 7,246,934 B2
(45) Date of Patent: Jul. 24, 2007

(54) BACKLIGHT UNIT

(75) Inventor: In Suk Jeong, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 106 days.

(21) Appl. No.: 11/114,134

(22) Filed: Apr. 26, 2005

(65) Prior Publication Data

US 2005/0243554 A1   Nov. 3, 2005

(30) Foreign Application Priority Data

Apr. 29, 2004   (KR) .................. 10-2004-0030073

(51) Int. Cl.
*F21V 7/04* (2006.01)
(52) U.S. Cl. .......................... 362/632; 349/58
(58) Field of Classification Search ................ 362/561, 362/614; 349/58
See application file for complete search history.

(56) References Cited

U.S. PATENT DOCUMENTS

| | | | |
|---|---|---|---|
| 6,749,315 B2 * | 6/2004 | Moon et al. | 362/97 |
| 6,843,584 B2 * | 1/2005 | Bang et al. | 362/249 |
| 6,880,953 B2 * | 4/2005 | Shin | 362/26 |
| 7,057,678 B2 * | 6/2006 | Ishida et al. | 349/58 |
| 7,093,970 B2 * | 8/2006 | Jang | 362/632 |

FOREIGN PATENT DOCUMENTS

JP   2001151009 A  *  6/2001

* cited by examiner

*Primary Examiner*—Ali Alavi
*Assistant Examiner*—Hargobind S. Sawhney
(74) *Attorney, Agent, or Firm*—McKenna Long & Aldridge LLP

(57) ABSTRACT

A backlight unit having external electrodes with increased lengths includes at least one fluorescent lamp and at least one supporter assembly for supporting the at least one fluorescent lamp. The at least one supporter assembly includes more than one inclined side surface and at least one cavity within one of the inclined surfaces, wherein each cavity receives an end of the at least one fluorescent lamp.

23 Claims, 10 Drawing Sheets

BACKLIGHT UNIT

This application claims the benefit of Korean Patent Application No. P2004-30073, filed on Apr. 29, 2004, which is hereby incorporated by reference for all purposes as if fully set forth herein.

BACKGROUND OF THE INVENTION

1. Field of the Invention

The principles of the present invention generally relate to backlight units. More particularly, the principles of the present invention relate to high efficiency backlight units having external electrodes with increased lengths.

2. Discussion of the Related Art

Generally, cathode ray tubes (CRTs) are one type of flat display device that has been widely used in applications such as televisions, monitors of measuring apparatus, and information terminals. Compared to other, more recently developed types of flat display devices however, CRTs are relatively large and heavy. Therefore, many applications substitute CRTs for liquid crystal display (LCD) devices, operating according to an electro-optical effect, plasma display panel (PDP) devices, operating according to a gas discharge, and electroluminescence display (ELD) devices, operating according to an electro-luminous effect, and the like.

Due to their low power consumption and compact, light-weight construction, LCD devices are extensively researched and implemented in various applications such as monitors for desktop computers and laptop computers, and the like, in addition to large-sized display devices (i.e., display devices having a display size of 20 inches or more). Many LCD devices can display images by changing the transmittance characteristics of ambient light passing through an LCD panel. However, a number of LCD devices display images by changing transmittance characteristics of light emitted from a light source of a backlight unit. Depending on the location of the light source with respect to the LCD panel, backlight units can be generally classified as either direct-type or edge-type.

Edge-type backlight units generally include a lamp unit provided along a lateral side of a light-guide plate that is disposed below an LCD panel. The lamp unit includes a fluorescent lamp as the light source emitting light, a lamp holder arranged at ends of the fluorescent lamp for protecting the fluorescent lamp, and a reflective sheet for reflecting light emitted by the fluorescent lamp into the light-guide plate. The light-guide plate then uniformly transmits the emitted and reflected light into the LCD panel. Because edge-type backlight units have a long lifespan and thin profile, they are typically incorporated within relatively small-sized LCD devices (e.g., monitors for laptop, desktop computers, etc.). However, as large-sized LCD devices become more common, research and development of direct-type backlight units has increased.

Direct-type backlight units generally include a plurality of fluorescent lamps provided below a lower surface of a light-diffusion sheet that is, in turn, disposed below an LCD panel. Because the entire surface of the LCD panel is illuminated with light emitted from the plurality of fluorescent lamps without the use of a light-guide plate, direct-type backlight units can transmit light to LCD panels more efficiently than edge-type backlight units and are, therefore, typically incorporated within large-sized LCD devices (e.g., large monitors, televisions, etc.).

Large-sized LCD devices are often driven for long periods of time. Therefore, the direct-type backlight units incorporated therein are also driven for long periods of time. If, for some reason (e.g., due to technical problems with the lamp, expiration of operational life of the lamp, etc.), a particular lamp within a direct-type backlight unit is no longer capable of emitting light (i.e., the lamp is "dark"), images expressed at portions of the LCD panel which are aligned with the dark lamp are not as bright as images expressed at surrounding portions of the LCD panel. Accordingly, LCD devices incorporating direct-type backlight units must be capable of being easily disassembled and re-assembled, facilitating replacement of the dark lamp.

FIG. 1 illustrates a perspective view of a related art backlight unit. FIG. 2 illustrates a cross sectional view of the related art backlight unit shown in FIG. 1.

Referring to FIGS. 1 and 2, the related art backlight unit includes a plurality of fluorescent lamps 31 and first and second supporter assemblies. The first supporter assembly includes first lower and upper supporters 41a and 43a, respectively, and the second supporter assembly includes second lower and upper supporters 41b and 43b, respectively. The first supporter assembly further includes first and third conductive layers 47a and 47c, respectively, and the second supporter assembly further includes second and fourth conductive layers 47b and 47d, respectively.

All of the fluorescent lamps 31 are the same size and shape and each fluorescent lamp 31 is separated from an adjacent fluorescent lamp 31 by a predetermined distance. Moreover, each fluorescent lamp 31 includes first and second external electrodes 32a and 32b provided at opposing ends thereof.

The first lower supporter 41a is spaced apart from the second lower supporter 41b by a predetermined distance that corresponds to the length of the fluorescent lamps 31. Moreover, the first and second lower supporters 41a and 41b (herein collectively referred to as "lower supporters 41") each include a first plurality of grooves 45 for receiving lower portions (i.e., lower cross-sectional halves) of opposing ends of the fluorescent lamps 31. The first and second upper supporters 43a and 43b (herein collectively referred to as "upper supporters 43") are aligned with the first and second lower supporters 41a and 41b, respectively, and include a second plurality of grooves 45 for receiving upper portions (i.e., upper cross-section halves) of opposing ends of the fluorescent lamps 31. Further, the lower surfaces of the lower supporters 41 and the lower surfaces of the upper supporters 43 are wider than their respective upper surfaces. It should be noted that the interior side surfaces of the lower and upper supporters 41 and 43, respectively, (i.e., the side surfaces adjacent to the fluorescent lamps 31) are reflective.

The first and second conductive layers 47a and 47b, respectively, are formed along the longitudinal lengths of the first and second lower supporters 41a and 41b, respectively, as well as on a surface including the first plurality of grooves 45. Similarly, the third and fourth conductive layers 47c and 47d, respectively, are formed along the lengths of the first and second upper supporters 43a and 43b, respectively, as well as on a surface including the second plurality of grooves 45.

Accordingly, when the lower supporters 41 are joined to corresponding upper supporters 43, the interior side surfaces of the joined first lower and upper supporters 41a and 43a, respectively, and the joined second lower and upper supporters 41b and 43b, respectively, taper toward each other from the top of the upper supporter 43 to the bottom of the lower supporter 41. Moreover, when the lower supporters 41 are joined to corresponding upper supporters 43, the first and second pluralities of grooves 45 accommodate opposing ends of the fluorescent lamps 31 to positionally fix and support the fluorescent lamps 31 within the related art backlight unit while the first to fourth conductive layers 47a to 47d contact the external electrodes 32a and 32b within the joined first and second plurality of grooves 45 to transmit power to the fluorescent lamps 31.

Referring specifically to FIG. 1, the related art backlight unit further includes a diffusion plate 100a and diffusion sheets 100b and 100c disposed above the upper supporters 43 which, together, uniformly diffuse light generated by the fluorescent lamps 31.

As is understood from the discussion of FIGS. 1 and 2, the related art backlight unit can be characterized as having a luminous area (corresponding to a central portion of the area between the first lower and upper supporters 41a and 43a and the second lower and upper supporters 41b and 43b) and a non-luminous area (corresponding to the area between the luminous area and the first and second supporter assemblies in addition to portions of the top surface of the first and second supporter assemblies that are directly below the display area of the LCD panel), wherein the luminance at the non-luminous area is half the luminance at the luminous area. Accordingly, the average luminance of the entire backlight unit is determined, in large part, by the size of the non-luminous area and the reflective characteristics of the interior side surfaces of the first and second supporter assemblies. Moreover, images expressed at portions of the LCD panel that are aligned with the non-luminous area of the backlight unit are less bright than images expressed at portions of the LCD panel that are aligned with the luminous area of the backlight unit.

One method known to reduce the size of the non-luminous area involves uniformly reducing the width of the lower and upper supporters 41 and 43. However, and as shown in FIG. 2, uniformly reducing the width of the lower and upper supporters 41 and 43 undesirably exposes the first and second external electrodes 32a and 32b between the first lower and upper supporters 41a and 43a and the second lower and upper supporters 41b and 43b. During operation of the backlight unit shown in FIG. 2, the exposed portions of the first and second external electrodes 32a and 32b cast shadows onto portions of the diffusion plate 100a and diffusion sheets 100b and 100c that are next to the supporters and, therefore, minimize the benefits obtained by reducing the width of the lower and upper supporters 41 and 43.

Referring to FIG. 3, shadows cast by the exposed portions of the first and second external electrodes may be eliminated by reducing the length of the first and second external electrodes 32a and 32b to a predetermined length "a" that corresponds with a longitudinal width of the first and second plurality of grooves 45 within the lower and upper supporters 41 and 43 having the uniformly reduced width. However, as the length of the external electrodes 32a and 32b decreases, the tube voltage of the fluorescent lamp 31 undesirably increases and must be controlled to be below 900 Vrms. However, when the tube voltage is below 900 Vrms, the efficiency at which the fluorescent lamps 31 are driven to emit light is decreased.

Referring to FIG. 4, to solve the problems discussed above with respect to FIGS. 2 and 3, the width of the lower and upper supporters 41 and 43 can be uniformly increased, along with the longitudinal width of the first and second pluralities of grooves 45, allowing the first and second external electrodes 32a and 32b to have increased lengths which are completely received within the first and second pluralities of grooves 45. However, as the width of the lower and upper supporters 41 and 43 uniformly increases, the extended top surface portion of the upper supporters 43 is adjacent to the diffusion plate 100a and, therefore, cannot reflect light emitted by the lamps 31. Accordingly, the size of the aforementioned luminous area decreases and the size of the non-luminous area increases when the thickness of the lower and upper supporters 41 and 43 is uniformly increased.

Referring to FIG. 5, to solve the problems accompanied by the unreflective top surface portion of the upper supporters 43 shown in FIG. 4, the width of the lower and upper supporters 43 can be gradually increased from the top of the upper supporters 43 to the bottom of the lower supporters 41, in proportion to the distance from the top of the upper supporters 43. Accordingly, an inclination angle of the interior side surface of the lower and upper supporters 41 and 43 can be increased from some initial inclination angle, as illustrated in FIGS. 2 to 4, to an adjusted inclination angle θ1, between 30° and 50°, as measured from a normal line. As a result, the first and second external electrodes 32a and 32b having the increased length can be completely accommodated within the first and second pluralities of grooves 45 while the surface area of the upper supporters 43 that is adjacent to the diffusion plate 100a can be minimized. However, the reflective interior side surfaces of the lower and upper supporters cannot effectively reflect light emitted by the lamps 31 when the inclination angle θ1 is greater than 22°. Accordingly, the backlight unit shown in FIG. 5 effectively minimizes the benefit obtained by reducing surface area of the upper supporters 43 that is adjacent to the diffusion plate 100a while increasing the length of the first and second external electrodes 32a and 32b that are completely received within the first and second pluralities of grooves 45.

SUMMARY OF THE INVENTION

Accordingly, the principles of present invention are directed to a backlight unit that substantially obviates one or more of the problems due to limitations and disadvantages of the related art.

An advantage of the present invention provides a high efficiency backlight unit having external electrodes with increased lengths.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit may, for example, include a plurality of fluorescent lamps; and a supporter for supporting the plurality of fluorescent lamps, wherein the supporter may, for example, include a plurality of cavities for receiving opposing ends of the fluorescent lamps. Further, the supporter may, for example, include interior side surfaces having a plurality of inclined surfaces.

In another aspect of the present invention, a backlight unit may, for example, include a plurality of fluorescent lamps, wherein each fluorescent lamp may include a tube and external electrodes at opposing ends of the tube; a first lower supporter separated from a second lower supporter by a predetermined distance corresponding to the length of the fluorescent lamp; and a first upper supporter separated from a second upper supporter aligned with the first and second lower supporters, respectively. The first and second lower supporters may, for example, include a first plurality of grooves configured to receive the opposing ends of the fluorescent lamps. Similarly, the first and second upper supporters may, for example, include a second plurality of grooves configured to receive the opposing ends of the fluorescent lamps. Accordingly, the first and second plurality of grooves may fix and support the fluorescent lamps within the backlight unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 6:
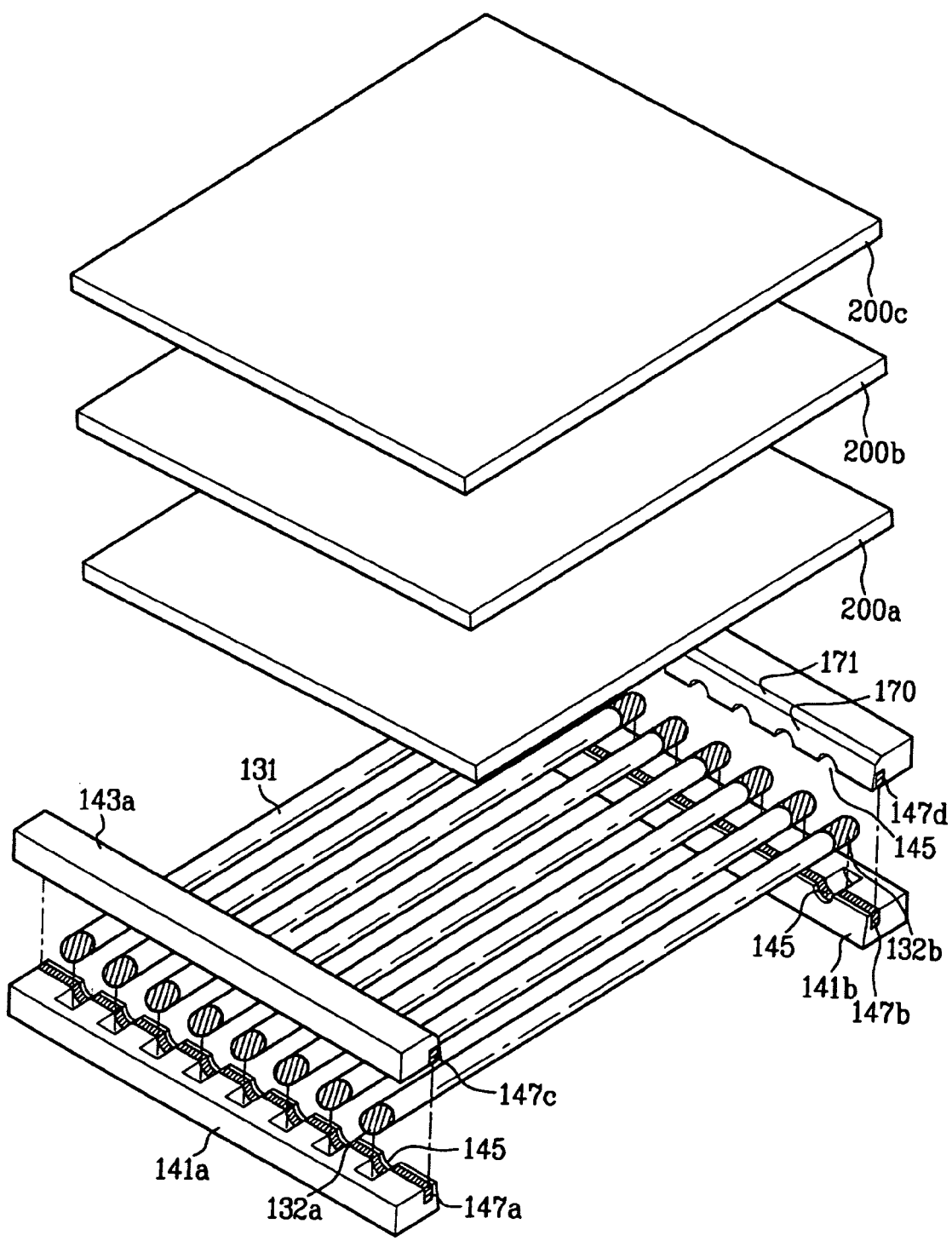
FIG. 6 illustrates a perspective view of an exemplary backlight unit according to principles of the present invention.
Figure 7:
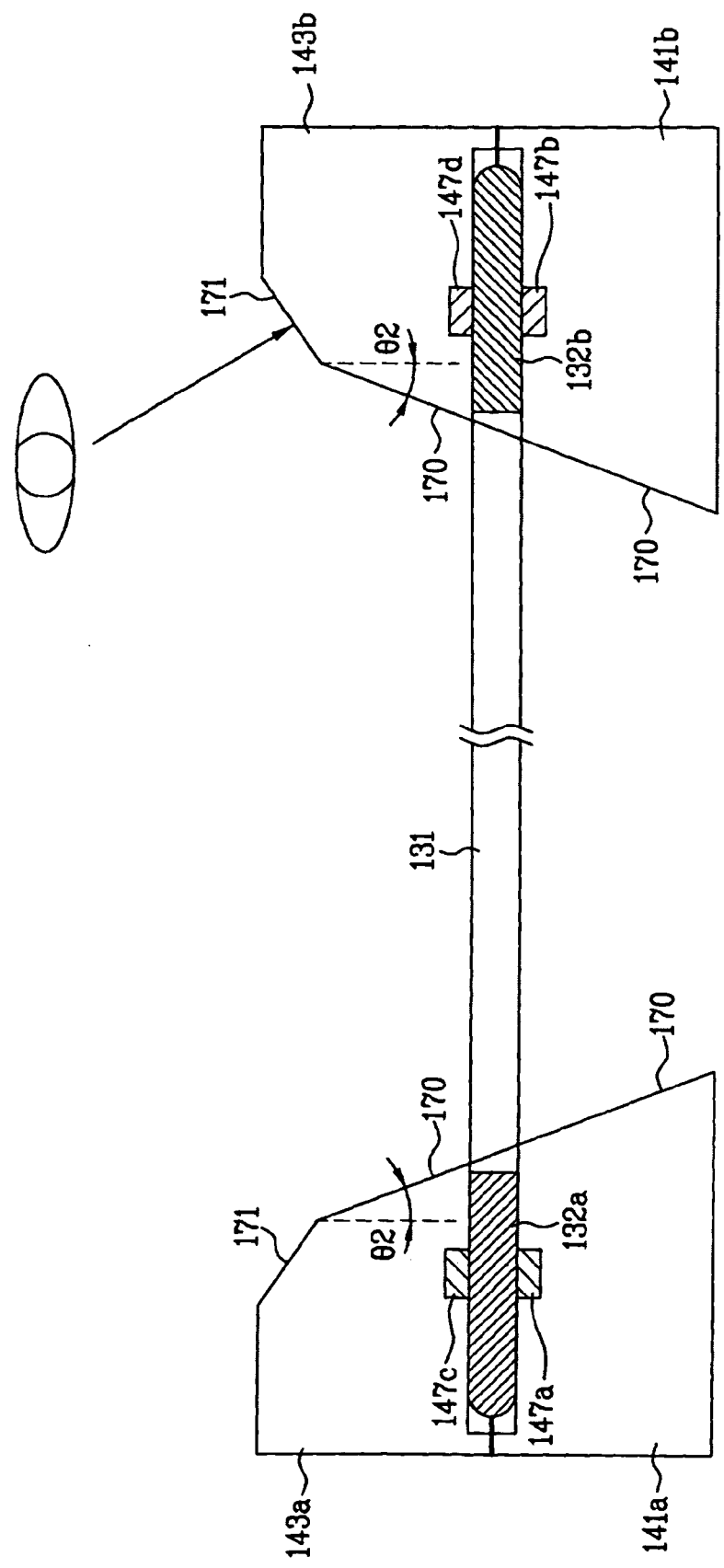
FIG. 7 illustrates a cross-sectional view of the backlight unit shown in FIG. 6.
Figure 8:
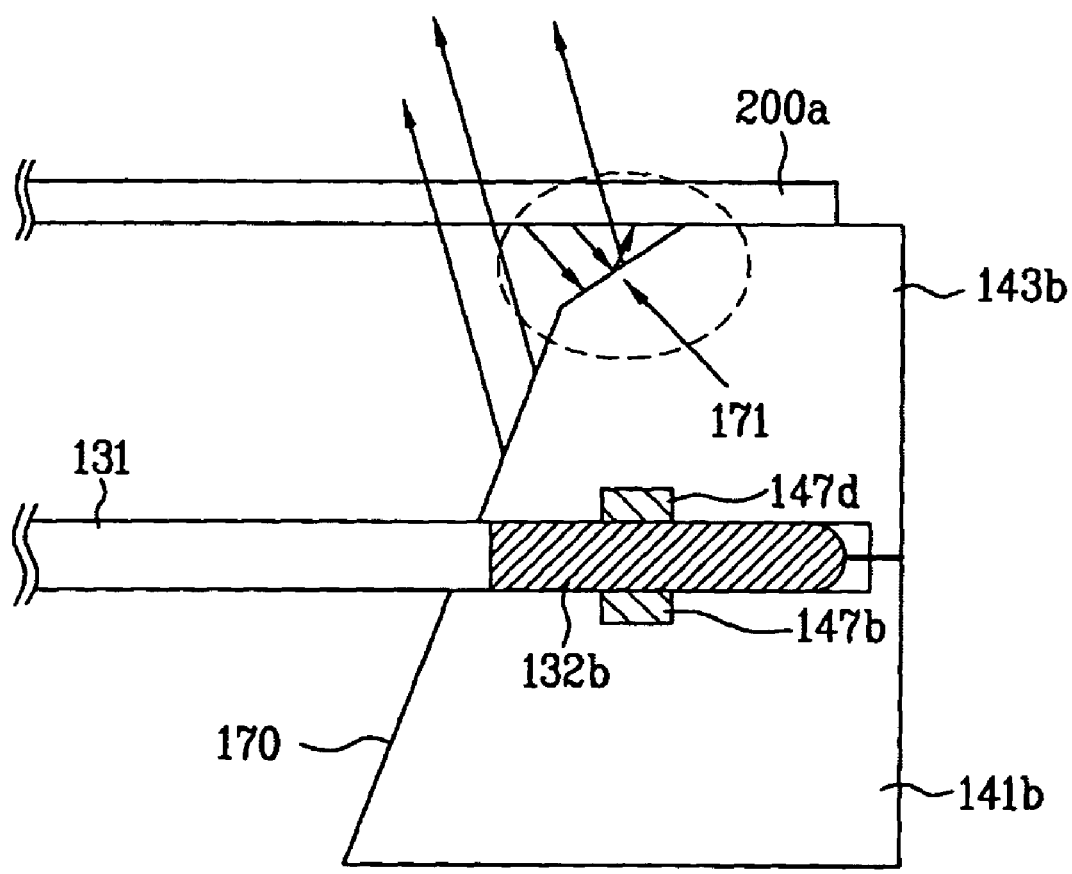
FIG. 8 illustrates an exemplary spatial relationship between the supporter assembly and a diffusion plate according to principles of the present invention.

FIG. 6 illustrates a perspective view of an exemplary backlight unit according to principles of the present invention. FIG. 7 illustrates a cross-sectional view of the backlight unit shown in FIG. 6. FIG. 8 illustrates an exemplary relationship between a supporter assembly and a diffusion plate according to principles of the present invention.

Referring to FIGS. 6 and 7, the backlight unit according to principles of the present invention may, for example, include a plurality of fluorescent lamps 131 (e.g., external electrode fluorescent lamps (EEFLs), etc.) and first and second supporter assemblies. The first supporter assembly may, for example, include first lower and upper supporters 141a and 143a, respectively, and the second supporter assembly may, for example, include second lower and upper supporters 141b and 143b, respectively. In one aspect of the present invention, the first upper and lower supporters 141a and 143a may be detachably coupled to each other. Alternatively, or additionally, the second upper and lower supporters 141b and 143b may be detachably coupled to each other. In another aspect of the present invention, the first upper and lower supporters 141a and 143a may be integrally formed together. Alternatively, or additionally, the second upper and lower supporters 141b and 143b may be integrally formed together. The first supporter assembly may further include first and third conductive layers 147a and 147c, respectively, and the second supporter assembly may further include second and fourth conductive layers 147b and 147d, respectively. Although the lamps 131 are illustrated as being substantially straight, it will be appreciated that the lamps 131 may be curved (e.g., in a U-shape, or the like).

According to principles of the present invention, the plurality of fluorescent lamps 131 may be arranged substantially parallel to each other and separated from each other by a predetermined distance. In one aspect of the present invention, each fluorescent lamp 131 may, for example, include first and second external electrodes 132a and 132b formed at first and second ends thereof. In another aspect of the present invention, the fluorescent lamps 131 may all have the same size and the same shape.

According to principles of the present invention the first lower supporter 141a may be separated from the second lower supporter 141b by a predetermined distance corresponding, for example, to the length of the fluorescent lamps 131. In another aspect of the present invention, the lower supporters 141a and 141b (herein collectively referred to as "lower supporters 141") may include a first plurality of grooves 145 dimensioned for receiving a portion of each opposing end of the fluorescent lamps 131. In yet another aspect of the present invention, the first plurality of grooves 145 may, for example, be semi-circular to receive the lower cross-sectional halves of opposing ends of the fluorescent lamps 131.

Similarly to the first and second lower supporters 141a and 141b, the first upper supporter 143a may be separated from the second upper supporter 143b by a predetermined distance that corresponds to the length of the fluorescent lamps 131. Accordingly, the first and second lower supporters 141a and 141b may be aligned with the first and second upper supporters 143a and 143b (herein collectively referred to as "upper supporters 143"), respectively, to fix and support each of the fluorescent lamps 131 within the backlight unit. In one aspect of the present invention, the upper supporters 143 may include a second plurality of grooves 145, dimensioned so as to receive a portion of each end of the fluorescent lamps 131. In another aspect of the present invention, the second plurality of grooves 145 may, for example, be semi-circular to receive the upper cross-sectional halves of ends of the fluorescent lamps 131.

According to principles of the present invention, the first and second conductive layers 147a and 147b, respectively, may be formed along the longitudinal lengths of the first and second lower supporters 141a and 141b, respectively, and within the first plurality of grooves 145. Similarly, the third and fourth conductive layers 147c and 147d, respectively, may be formed along the longitudinal lengths of the first and second upper supporters 143a and 143b, respectively, and within the second plurality of grooves 145. In one aspect of the present invention, the first to fourth conductive layers 147a, 147b, 147c and 147d, respectively, may be formed, for example, by embedding conductive material within a trench formed along the longitudinal lengths of the respective supporters. In another aspect of the present invention, the first to fourth conductive layers 147a, 147b, 147c and 147d, respectively, may be formed, for example, by coating conductive material onto the surface of the respective supporters in which the first and second plurality of grooves 145 are defined.

When the first and second lower supporters 141a and 141b are joined to respective ones of the first and second upper supporters 143a and 143b to form the first and second supporter assemblies, the first and second pluralities of grooves 45 may be joined together to form a plurality of cavities that accommodate first and second ends of the plurality of fluorescent lamps 131. In one aspect of the present invention, the external electrodes 132a and 132b may be completely received within the first and second plurality of grooves 145 such that they are not exposed to a diffusion plate 200a by the first and second supporter assemblies. In another aspect of the present invention, the first and second pluralities of grooves 145 may extend partially through the thickness of the lower and upper supporters 141 and 143 such that the external electrodes 132a and 132b of each fluorescent lamp 131 may be completely received and enclosed within the first and second pluralities of grooves 145. In yet another aspect of the present invention, however, the first and second pluralities of grooves 145 fully extend through the thickness of the lower and upper supporters 141 and 143 such that the external electrodes 132a and 132b of each fluorescent lamp 131 are completely received within the first and second pluralities of grooves 145 and such that ends of the lamps 131 may be exposed by the first and second pluralities of grooves 145. Accordingly, the first and second plurality of grooves 145 may positionally fix and support the fluorescent lamps 131 within the backlight unit while the first to fourth conductive layers 147a to 147d may contact the external electrodes 132a and 132b that are received within the grooves to transmit power to the plurality of fluorescent lamps 131.

Figure 9:
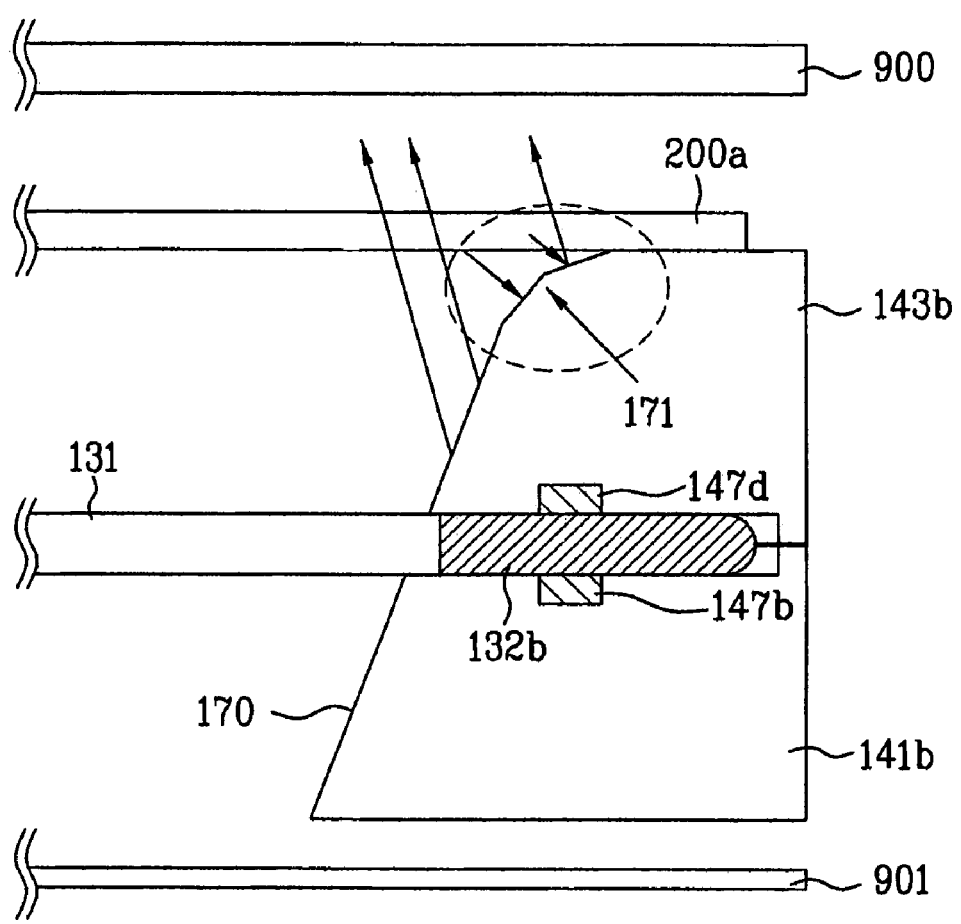
FIG. 9 illustrates another exemplary spatial relationship between the supporter assembly and a diffusion plate according to principles of the present invention.
Figure 10:
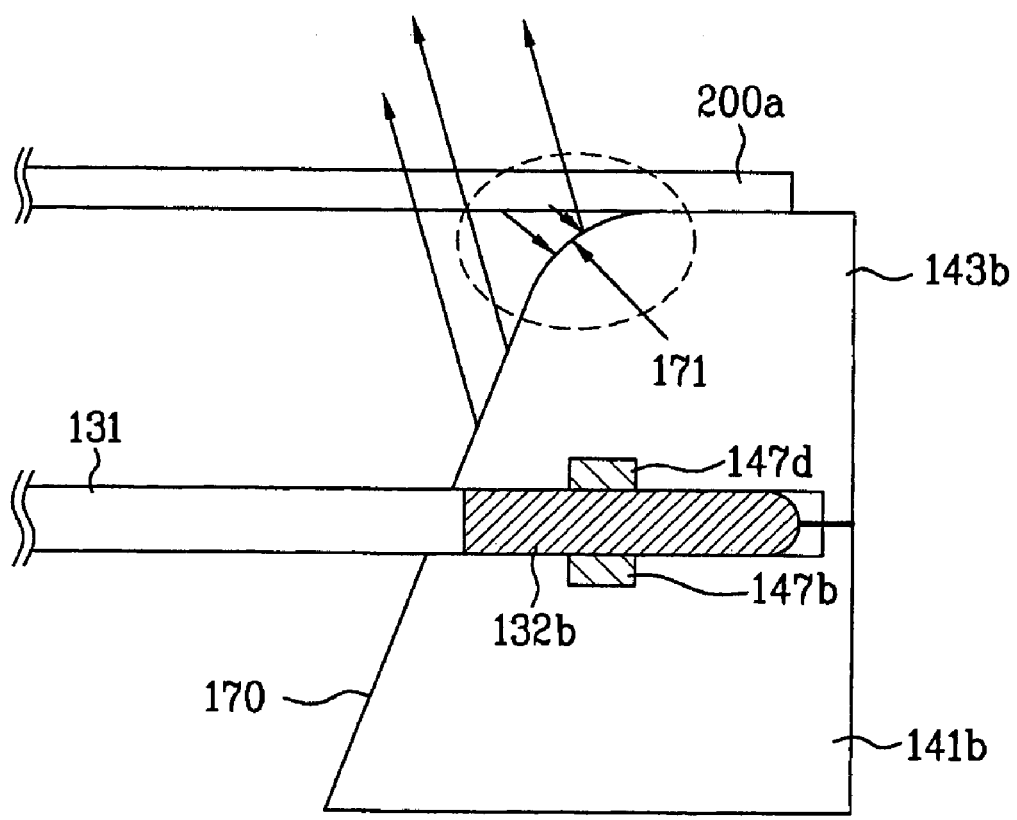
FIG. 10 illustrates another exemplary spatial relationship between the supporter assembly and a diffusion plate according to principles of the present invention.

According to principles of the present invention, the lower surfaces of each of the lower and upper supporters 141 and 143 may be wider than their respective upper surfaces such that the first and second supporter assemblies become narrower from bottoms to the tops thereof. In one aspect of the present invention, the width of the lower supporters 141 may be increased gradually from the top of the lower supporters 141 to the bottom of the lower supporters 141 such that the lower supporters 141 include a main inclined surface 170. In another aspect of the present invention, the width of the upper supporters 143 may be increased discretely from the top of the upper supporters 143 to the bottom of the upper supporters 143 such that the upper supporters 143 include, for example, at least one auxiliary inclined surface at an upper portion thereof and a main inclined surface 170 below the auxiliary inclined surface 171. In yet another aspect of the present invention, the main inclined surface 170 may have a main inclination angle, $\theta 2$, that is equal to or less than 22°, when measured from a normal line, and the auxiliary inclined surface may have an auxiliary inclination angle that is greater the main inclination angle (e.g., between about 22° to about 90°). As shown in FIG. 9, the upper supporters 143 may include two or more inclined surfaces, wherein each inclined surface has an inclination angle that is incrementally reduced from the top of the upper supporter 143 to the bottom of the upper supporter 143. In FIG. 9, reference number 900 is an LCD panel, and reference number 901 is a reflective sheet. In another aspect of the present invention as shown in FIG. 10, the auxiliary inclined surface 171 may be provided as a curved surface.

According to principles of the present invention, and as shown in FIG. 8, the main inclined surface 170 of the lower and upper supporters 141 and 143 may function as a main reflective surface that reflects light emitted by the fluorescent lamps 131 toward the diffusion plate 200a. Moreover, the auxiliary inclined surface 171 of the upper supporters 143 may function as an auxiliary reflective surface that reflects light emitted by the fluorescent lamps 131 toward the diffusion plate 200a. Further, because the auxiliary inclined surface 171 is formed at the upper portion of each upper supporter 143, light may be reflected into peripheral portions of the diffusion plate 200a, thereby increasing the size of the aforementioned luminous area and increasing the average luminance of the backlight unit.

Referring specifically to FIG. 6, the backlight unit according to principles of the present invention may, for example, include the aforementioned diffusion plate 200a in addition to diffusion sheets 200b and 200c. In one aspect of the present invention, the diffusion plate 200a and the diffusion sheets 200b and 200c may be disposed above the first and second upper supporters 143a and 143b to uniformly diffuse the light emitted by the fluorescent lamps 131 and transmit the diffused light into an LCD panel (not shown). Although not shown, a reflective sheet may be disposed below the first and second lower supporters 141a and 141b to uniformly reflect light emitted by the fluorescent lamps 131 toward the LCD panel.

Figure 1:
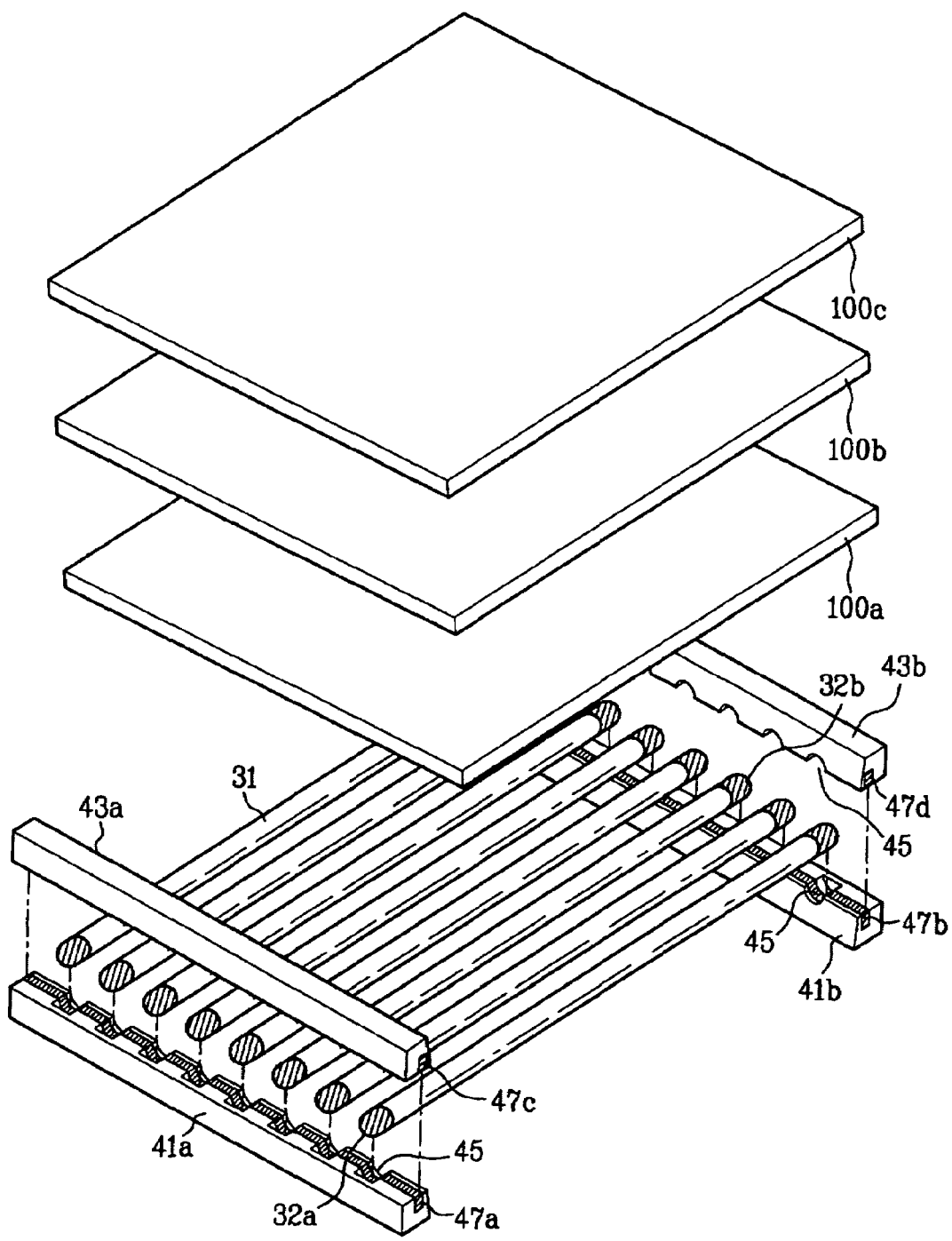
FIG. 1 illustrates a perspective view of a related art backlight unit.
Figure 2:
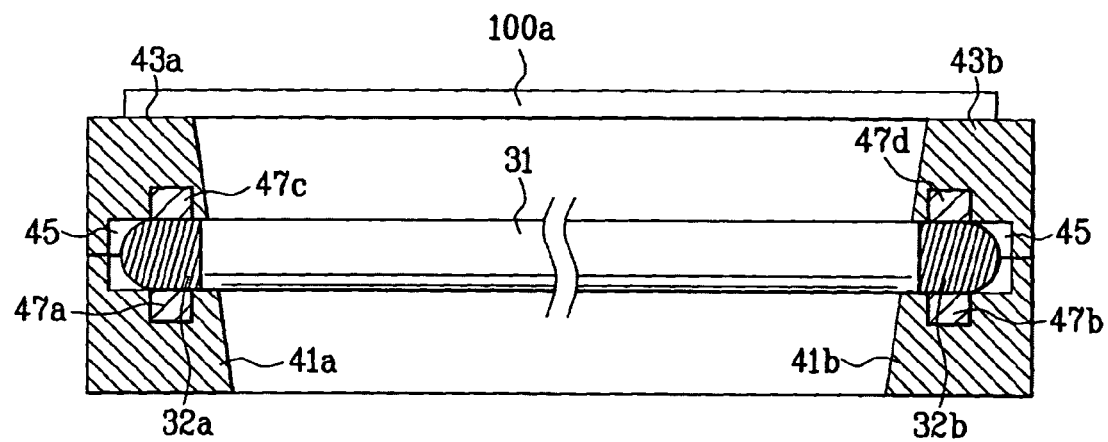
FIG. 2 illustrates a cross-sectional view of the related art backlight unit shown in FIG. 1.
Figure 3:
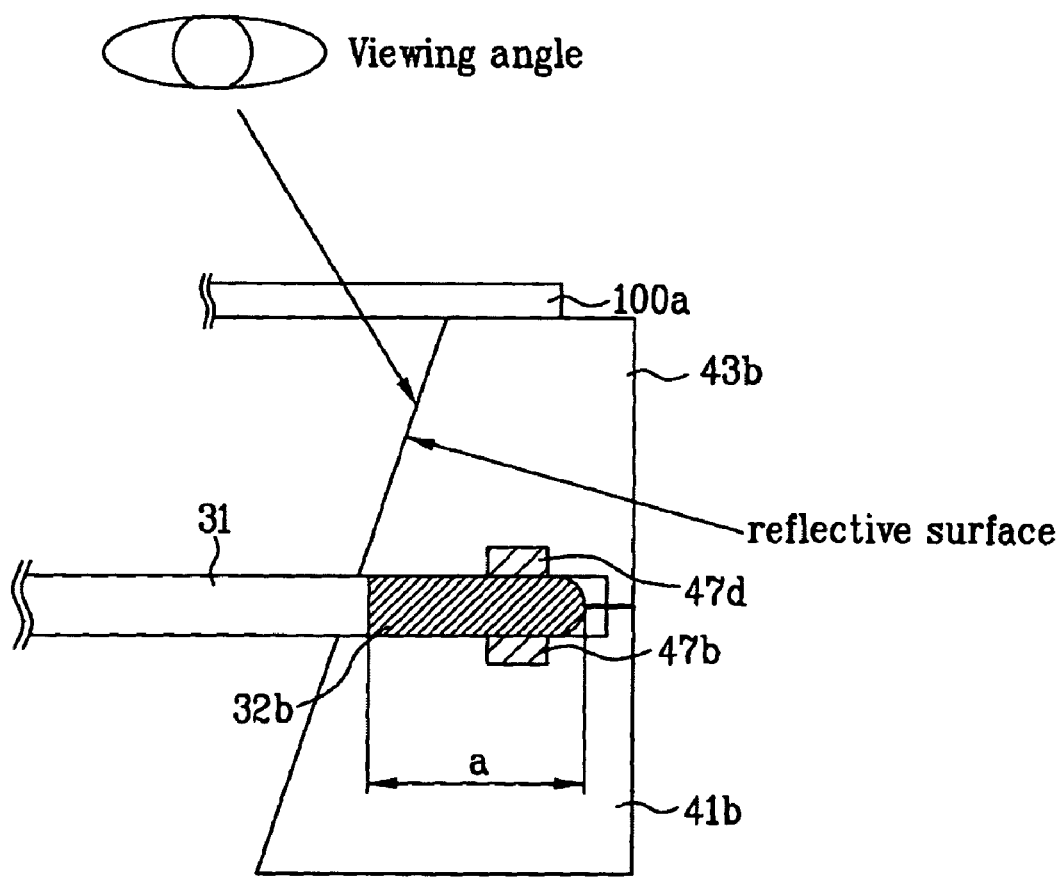
FIGS. 3 to 5 illustrate schematic views of various related art backlight unit configurations.
Figure 4:
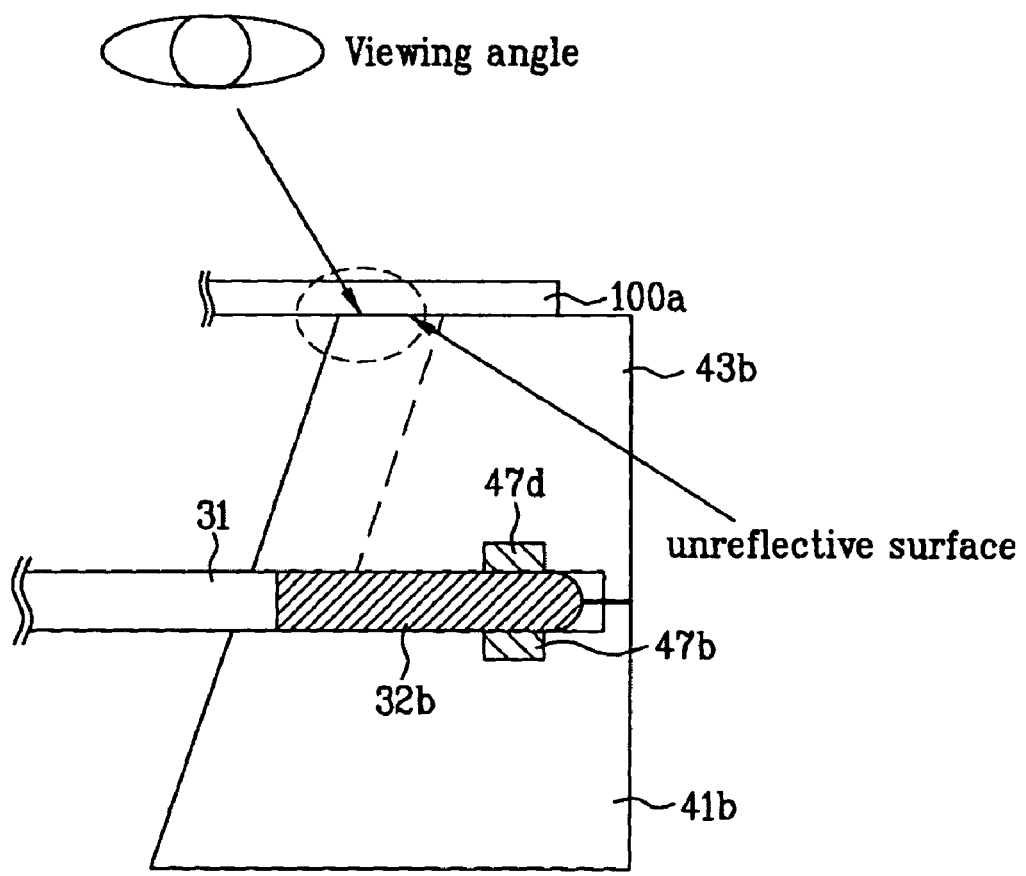
Figure 5:
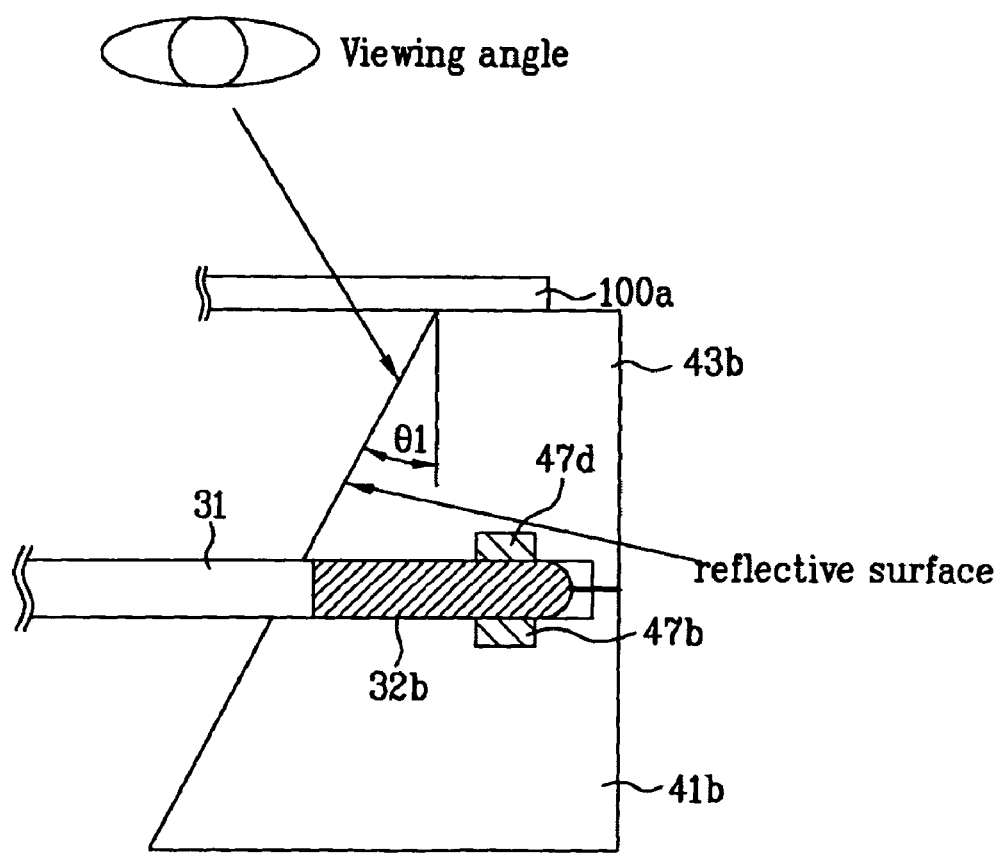

By providing the upper supporter 143 with both a main inclined surface 170 and an auxiliary inclined surface 171, the area of the upper supporters 143 that is adjacent to the diffusion plate 200a may be less than the area of the upper supporters 43 that is adjacent to the diffusion plate 100a shown in FIG. 4. Further, longitudinal width of the first and second pluralities of grooves 145 may be increased compared to the longitudinal width of the first and second pluralities of grooves 45 shown in FIGS. 2 and 3, allowing the lengths of the external electrodes 132a and 132b to be increased compared to the length of the external electrodes shown in FIG. 3. Moreover, the main inclination angle of the main inclined surfaces 170 may be less than the adjusted inclination angle $\theta 1$, of the interior side surfaces shown in FIG. 5. As a result, the average luminance of the backlight unit shown in FIGS. 6 to 8 may be greater than the average luminance of the aforementioned backlight units shown in FIGS. 1 to 5 while the length of the external electrodes 132a and 132b may be increased, thereby lowering the driving voltage of the plurality of fluorescent lamps 131 and increasing the efficiency with which the plurality of fluorescent lamps 131 are driven. Further, the principles of the present invention may be readily extended to backlight units configured to be incorporated within large- and small-sized LCD devices.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight unit, comprising:
   at least one fluorescent lamp; and
   at least one supporter assembly for supporting the at least one fluorescent lamp, wherein the at least one supporter assembly includes:
   a plurality of inclined side surfaces, wherein two of the inclined side surfaces have different inclinations; and at least one cavity within one of the plurality of inclined surfaces, wherein each cavity receives an end of the at least one fluorescent lamp.

2. The backlight unit of claim 1, wherein the at least one supporter assembly includes:
an upper supporter; and
a lower supporter.

3. The backlight unit of claim 2, wherein the upper and lower supporters are detachably coupled together.

4. The backlight unit of claim 2, wherein the upper and lower supporters are integrally formed together.

5. The backlight unit of claim 1, wherein the at least one fluorescent lamp assembly includes a plurality of fluorescent lamps.

6. The backlight unit of claim 1, wherein the at least one supporter assembly includes an upper supporter and a lower supporter.

7. The backlight unit of claim 1, wherein the at least one fluorescent lamp is provided as an external electrode fluorescent lamp having first and second ends and first and second external electrodes at the first and second ends, respectively.

8. A backlight unit, comprising:
at least one fluorescent lamp; and
at least one supporter assembly for supporting the at least one fluorescent lamp, wherein the at least one supporter assembly includes:
a plurality of inclined side surfaces; and
at least one cavity within one of the plurality of inclined surfaces, wherein each cavity receives an end of the at least one fluorescent lamp,
wherein plurality of inclined surfaces includes:
a main inclined surface; and
at least one auxiliary inclined surface elevationally above the main inclined surface, wherein an inclination angle of the main inclined surface is less than an inclination angle of the at least one auxiliary inclined surface.

9. The backlight unit of claim 8, wherein the at least one auxiliary inclined surface includes a plurality of sub-auxiliary inclined surfaces.

10. The backlight unit of claim 8, wherein the at least one auxiliary inclined surface includes a curved surface.

11. The backlight unit of claim 8, wherein an inclination angle of the main inclined surface is less than 22° with respect to a normal line.

12. The backlight unit of claim 8, wherein the auxiliary inclined surface is formed at an upper portion of the upper supporter.

13. The backlight unit of claim 8, wherein the main and auxiliary inclined surfaces reflect light emitted from the at least one fluorescent lamp.

14. A backlight unit, comprising:
at least one fluorescent lamp having first and second ends and first and second external electrodes at the first and second ends, respectively;
a first lower supporter and a second lower supporter separated from each other by a predetermined distance corresponding to the length of the at least one fluorescent lamp, wherein the first and second lower supporters include a first plurality of grooves receiving portions of the first and second ends of the fluorescent lamps; and
a first upper supporter and a second upper supporter aligned with the first and second lower supporters, respectively, wherein the first and second upper supporters include a second plurality of grooves receiving the portions of the first and second ends of the fluorescent lamps wherein the first and second upper supporters are coupled to the first and second lower supporters, and wherein coupled ones of lower and upper supporters include a plurality of inclined side surfaces, wherein two of the inclined side surfaces have different inclinations.

15. The backlight unit of claim 14, further including conductive layers formed on a surface including the first and second plurality of grooves of the first and second lower supporters and the first and second upper supporters.

16. The backlight unit of claim 14, further comprising a reflective sheet below the first and second lower supporters.

17. The backlight unit of claim 14, further comprising a light-diffusion plate above the first and second upper supporters.

18. The backlight unit of claim 14, wherein the at least one fluorescent lamp includes a plurality of fluorescent lamps.

19. backlight unit, comprising:
at least one fluorescent lamp having first and second ends and first and second external electrodes at the first and second ends, respectively;
a first lower supporter and a second lower supporter separated from each other by a predetermined distance corresponding to the length of the at least one fluorescent lamp, wherein the first and second lower supporters include a first plurality of grooves receiving portions of the first and second ends of the fluorescent lamps; and
a first upper supporter and a second upper supporter aligned with the first and second lower supporters, respectively, wherein the first and second upper supporters include a second plurality of grooves receiving the portions of the first and second ends of the fluorescent lamps wherein the first and second upper supporters are coupled to the first and second lower supporters, and wherein coupled ones of lower and upper supporters include a plurality of inclined side surfaces,
wherein plurality of inclined surfaces includes:
a main inclined surface; and
at least one auxiliary inclined surface elevationally above the main inclined surface,
wherein an inclination angle of the main inclined surface is less than an inclination angle of the at least one auxiliary inclined surface.

20. The backlight unit of claim 19, wherein the at least one auxiliary inclined surface includes a plurality of sub-auxiliary inclined surfaces.

21. The backlight unit of claim 19, wherein the at least one auxiliary inclined surface includes a curved surface.

22. The backlight unit of claim 19, wherein an inclination angle of the main inclined surface is less than 22° with respect to a normal line.

23. liquid crystal display (LCD), comprising:
an LCD panel; and
a backlight unit, wherein the backlight unit includes:
at least one fluorescent lamp; and
at least one supporter assembly for supporting the at least one fluorescent lamp, wherein the at least one supporter assembly includes:
a plurality of inclined side surfaces, wherein two of the inclined side surfaces have different inclinations; and
at least one cavity within one of the plurality of inclined surfaces, wherein each cavity receives an end of the at least one fluorescent lamp.

* * * * *